US009698697B2

United States Patent
Wakabayashi et al.

(10) Patent No.: US 9,698,697 B2
(45) Date of Patent: Jul. 4, 2017

(54) POWER SUPPLY DEVICE, AND METHOD OF CONTROLLING POWER SUPPLY DEVICE

(71) Applicant: SHINDENGEN ELECTRIC MANUFACTURING CO., LTD., Tokyo (JP)

(72) Inventors: Koji Wakabayashi, Hanno (JP); Konosuke Nitta, Hanno (JP)

(73) Assignee: SHINDENGEN ELECTRIC MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 15/038,572

(22) PCT Filed: Nov. 29, 2013

(86) PCT No.: PCT/JP2013/082237
§ 371 (c)(1),
(2) Date: May 23, 2016

(87) PCT Pub. No.: WO2015/079572
PCT Pub. Date: Jun. 4, 2015

(65) Prior Publication Data
US 2016/0301320 A1    Oct. 13, 2016

(51) Int. Cl.
*H02M 1/08* (2006.01)
*H02M 3/335* (2006.01)
*H02M 1/00* (2006.01)

(52) U.S. Cl.
CPC ......... *H02M 3/33592* (2013.01); *H02M 1/08* (2013.01); *H02M 3/33569* (2013.01); *H02M 2001/0009* (2013.01); *Y02B 70/1475* (2013.01)

(58) Field of Classification Search
CPC .................. H02M 1/08; H02M 3/33592
See application file for complete search history.

(56) References Cited

U.S. PATENT DOCUMENTS

| 7,161,815 B2 * | 1/2007 | Mori ................. H02M 3/33507 363/21.12 |
| 2012/0294052 A1 * | 11/2012 | Reddy .................... H02M 1/36 363/49 |

FOREIGN PATENT DOCUMENTS

| JP | 05-095673 | 4/1993 |
| JP | 2007-151311 | 6/2007 |
| JP | 2009-213223 | 9/2009 |
| JP | 2012-130221 | 7/2012 |

OTHER PUBLICATIONS

International Search Report for PCT/JP2013/082237, mailed Feb. 18, 2014, 2 pages.
Written Opinion of the ISA for PCT/JP2013/082237, mailed Feb. 18, 2014, 3 pages.

* cited by examiner

*Primary Examiner* — Emily P Pham
(74) *Attorney, Agent, or Firm* — Nixon & Vanderhye P.C.

(57) ABSTRACT

A storage (80) stores a first drooping characteristic of a rated current Ioc1, and a second drooping characteristic of an allowable current value Ico2 that is greater than the rated current value Ioc1. A controller (70) is configured to select a drooping characteristic stored in the storage (80) in accordance with the current value detected by an output current detector (50) and a mask condition, and perform droop control.

4 Claims, 6 Drawing Sheets

POWER SUPPLY DEVICE, AND METHOD OF CONTROLLING POWER SUPPLY DEVICE

This application is the U.S. national phase of International Application No. PCT/JP2013/082237 filed Nov. 29, 2013, the entire contents of which is hereby incorporated by reference.

TECHNICAL FIELD

The present invention relates to a power supply device, and a method of controlling the power supply device.

BACKGROUND ART

In power supply devices, in a case where a load current exceeding a rated current is generated, an output current is controlled by an overcurrent protection circuit. Additionally, a power supply device, which temporarily supply to a load an output current equal to or larger than the rated current, has been proposed (see, for example, Patent Document 1). In the technique described in Patent Document 1, a power-up circuit, which detects an overcurrent and makes a change so as to temporarily increase a reference voltage as needed, is added to an overcurrent detection circuit. Then, the power-up circuit is actuated to increase the reference voltage of the overcurrent detection circuit, accordingly temporarily increasing the load current to the rated output current or larger.

CITATION LIST

[Patent Document]
[Patent Document] Japanese Patent Application Laid-Open Publication No. H05-95673

DISCLOSURE OF THE INVENTION

Problems to be Solved by the Invention

In the above-described technique, however, when a current equal to or larger than the rated current is temporarily flown, the temperature of each component included in the power supply device exceeds the rated temperature. For this reason, there has been a problem in that in order to flow a load current equal to or larger than the rated current, it is necessary to increase the size of the power supply device and the components thereof so that the rated temperature is not exceeded even when a current equal to or larger than the rated current is flown.

The present invention has been made in view of the above problems, and has an object to provide a power supply device and a method of controlling the power supply device capable of temporarily increasing the output current without increasing the size of the power supply device and components thereof.

Means for Solving the Problems

To achieve the above object, a power supply device according to one embodiment of the present invention includes: a storage storing a first drooping characteristic of a rated output current value, and a second drooping characteristic of an allowable current value that is greater than the rated output current value; an output current detector configured to detect a load current value; and a controller configured to select a drooping characteristic stored in the storage in accordance with the load current value detected by the output current detector and a mask condition.

A method of controlling a power supply device according to one embodiment of the present invention includes: previously storing a first drooping characteristic of a rated output current value, and a second drooping characteristic of an allowable current value that is greater than the rated output current value; and selecting a drooping characteristic stored in the storage in accordance with the load current value detected by the output current detector and a mask condition, and performing droop control.

Effects of the Invention

According to the present invention, a configuration has been made such that a drooping characteristic is selected based on the detected load current value, and in accordance with the selected drooping characteristic, a current is flown according to an allowable current value, within a safe range of the characteristics of the power supply device and components thereof, so that a load current value becomes temporarily greater than the rated current value. Therefore, it is possible to use the existing power supply device and components thereof, and temporarily increase the load current without increasing the size thereof. Additionally, the function of masking a drooping characteristic used at the time of overcurrent makes it possible to make a heat radiation design of the power supply device in accordance with the rated current, thus enabling a reduction in size of the power supply device.

MODE FOR CARRYING OUT THE INVENTION

[First Embodiment]

Figure 1:
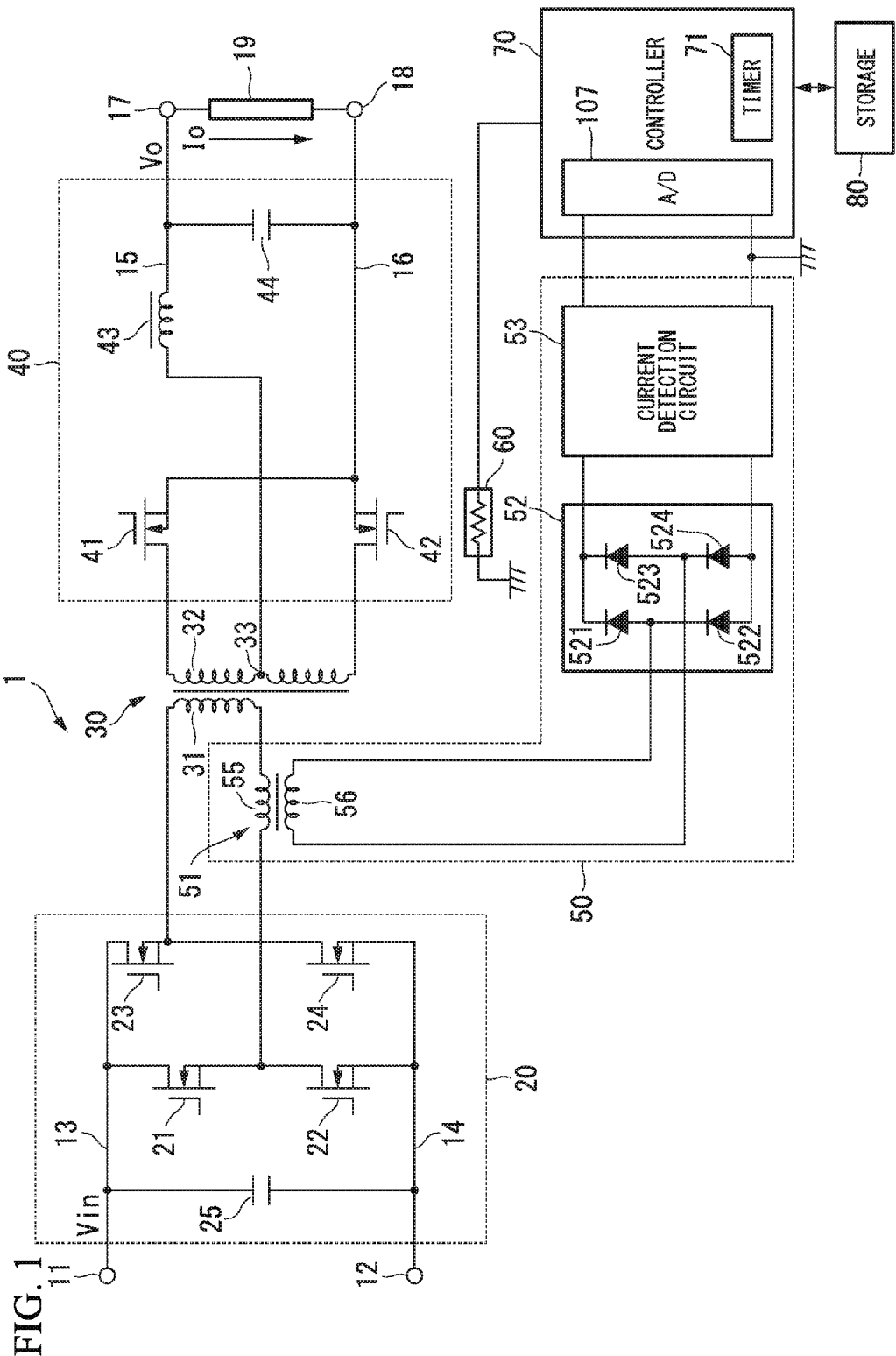
FIG. 1 is a circuit diagram showing a configuration of a power supply device according to a first embodiment.

Hereinafter, embodiments of the present invention will be described with reference to the drawings. FIG. 1 is a circuit diagram showing a configuration of a power supply device 1 according to a first embodiment of the present invention. As shown in FIG. 1, the power supply device 1 includes a primary side circuit 20, a main transformer 30, a secondary side circuit 40, an output current detector 50, a temperature detecting element 60, a controller 70, and a storage 80.

The primary side circuit 20 includes switching elements 21 to 24, and an input capacitor 25. The switching elements 21 and 22 are connected in series, and the switching element 23 and 24 are connected in series. Additionally, each of the switching elements 21 to 24 includes, for example, an N-channel MOS FET (field effect transistor). Input power supply lines 13 and 14 are supplied with the DC input power from power input terminals 11 and 12. The input capacitor 25 is connected between the input power supply line 13 and the input power supply line 14. Further, the switching elements 21 and 22, and the switching elements 23 and 24 are connected between the input power supply line 13 and the input power supply line 14.

The main transformer 30 has a primary side coil 31 and a secondary side coil 32, and performs conversion of the power supply voltage. An intermediate tap 33 is derived from the secondary side coil 32. One end of the primary side coil 31 of the main transformer 30 is connected to a connection point between the switching element 23 and the switching element 24. The other end of the primary side coil 31 is connected to a connection point between the switching element 21 and the switching element 22 through a primary side coil 55 of a current transformer 51.

The secondary side circuit 40 includes rectifier elements 41 and 42, an output choke coil 43, and an output capacitor 44. The rectifier elements 41 and 42 perform synchronous rectification. The rectifier elements 41 and 42 include, for example, MOSFETs.

One end of the rectifier element 41 (e.g., a drain) is connected to one end of the secondary side coil 32 of the main transformer 30. The other end of the rectifier element 41 (e.g., a source) is connected to an output power supply line 16. A control terminal of the rectifier element 41 (e.g., a gate) is connected to a synchronous rectification controller which is not shown.

One end of the rectifier element 42 (e.g., a drain) is connected to the other end of the secondary side coil 32. The other end of the rectifier element 42 (e.g., a source) is connected to the output power supply line 16. A control terminal of the rectifier element 42 (e.g., a gate) is connected to a synchronous rectification controller which is not shown. Here, the controller 70 may have a function of the synchronous rectification controller.

One end of the output choke coil 43 is connected to the intermediate tap 33 of the secondary side coil 32, and the other end thereof is connected to an output supply line 15.

One end of the output capacitor 44 is connected to the output supply line 15, and the other end thereof is connected to an output power supply line 16.

The output power line 15 is connected to a power supply output terminal 17, and the output power supply line 16 is connected to a power supply output terminal 18. Additionally, a load 19 is connected between the power supply output terminal 17 and the power supply output terminal 18.

Here, as the output choke coil 43, one having a magnetic bias gap is used. In such an output choke coil 43, it is possible to enlarge the DC bias characteristics by use of the magnetic bias technique.

The output current detector 50 includes a current transformer 51, a rectifier circuit 52, and a current detection circuit 53.

A secondary side coil 56 of the current transformer 51 is connected to the rectifier circuit 52.

The rectifier circuit 52 includes rectifiers 521 to 524. In the rectifier circuit 52, the rectifiers 521 to 524 constitute a bridge rectifier circuit. Each of the rectifiers 521 to 524 is, for example, a diode.

An input terminal of the rectifier 521 (e.g., an anode) is connected to an output terminal (e.g., a cathode) of the rectifier 522 and one end of the secondary side coil 56. An output terminal of the rectifier 521 (e.g., a cathode) is connected to an output terminal of the rectifier 523 (e.g., a cathode), and is connected to the current detection circuit 53. An input terminal of the rectifier 523 (e.g., an anode) is connected to an output terminal of the rectifier 524 (e.g., a cathode) and the other end of the secondary side coil 56. An input terminal of the rectifier 522 (e.g., an anode) is connected to an input terminal (e.g., an anode) of the rectifier 524, and is connected to the current detection circuit 53.

The current detection circuit 53 detects a current detection signal rectified through the rectifier circuit 52 from the current transformer 51, and outputs the detected current detection signal to the controller 70. Here, a configuration of the current detection circuit 53 will be described later.

One end of the temperature detecting element 60 is connected to an input terminal of the controller 70, and the other end thereof is grounded. The temperature detecting element 60 is provided in the vicinity of at least any one of the switching elements 21 to 24, the main transformer 30, the rectifier elements 41 and 42, and the output choke coil 43, and detects the temperature of the power supply device 1. As the temperature detecting element 60, for example, a thermistor is used. An output of the temperature detecting element 60 is supplied to the controller 70.

The controller 70 includes a timer 71, and an A/D (analog to digital converter) 107. Additionally, control terminals (gates) of the respective switching elements 21 to 24 of the primary side circuit 20 and the storage 80 are connected to the controller 70. The controller 70 includes a CPU (Central Processing Unit), a RAM (Random Access Memory), a ROM (Read Only Memory), A/D and D/A (Digital to Analog converter) converters, and the like.

The controller 70 generates switching pulses, and supplies the generated switching pulses to the control terminals (e.g., gates) of the switching elements 21 to 24. The controller 70 controls the drooping characteristics of the power supply device 1, in accordance with the current value converted by the A/D 107 and the temperature.

Additionally, the synchronous rectifier control circuit, which is not shown, generates switching pulses, and supplies the generated switching pulses to the control terminals (gates) of the rectifier elements 41 and 42.

The timer 71 is used to measure an elapsed time period from the time the output current exceeds a rated current value Ioc1.

The input terminal of the A/D 107 is connected to the output terminal of the current detection circuit 53. The A/D 107 converts the current value output from the current detection circuit 53 into a digital value. Similarly, the temperature detected by the temperature detecting element 60 is converted into a digital value by an unillustrated A/D included in the controller 70.

The storage 80 includes, for example, an EEPROM (Electronic Erasable Programmable Read Only Memory), and stores parameters used for control to be performed by the controller 70. Here, in the storage 80, a drooping characteristic of a rated current value Ioc1, a drooping characteristic of a maximum allowable current value Ioc2, a drooping characteristic of a heating time allowable current value Tot, various parameters such as a mask period Tm. These parameters will be described later. Here, the storage 80 may be configured to be built in the controller 70.

Figure 2:
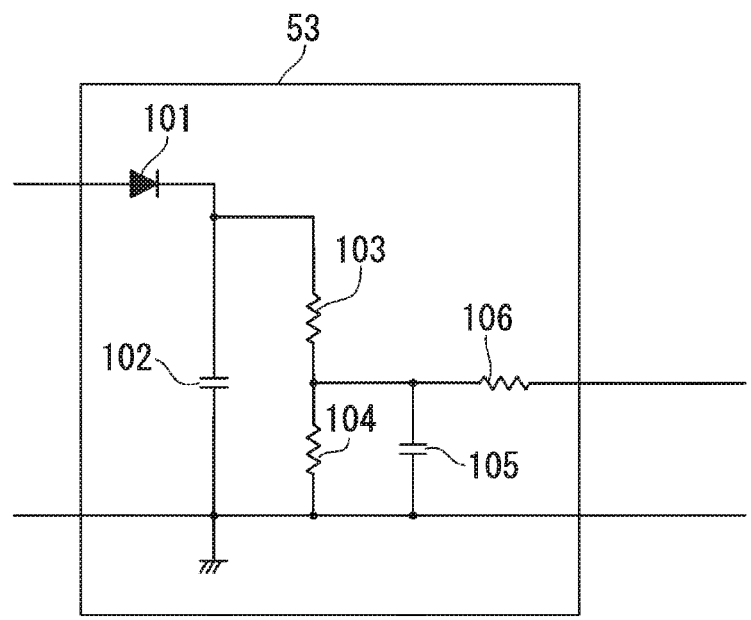
FIG. 2 is a circuit diagram showing a configuration of a current detection circuit in the power supply device according to the first embodiment.

Next, the current detection circuit 53 will be described. FIG. 2 is a circuit diagram showing a configuration of the current detection circuit 53 in the power supply device 1 according to the present embodiment.

As shown in FIG. 2, the current detection circuit 53 includes a rectifier 101, a capacitor 102, a resistor 103, a resistor 104, a capacitor 105, and a resistor 106.

An input terminal of the rectifier 101 (e.g., an anode) is connected to a connection point between the output terminal of the rectifier 521 and the output terminal of the rectifier 523 of the rectifier circuit 52. An output terminal (e.g., a cathode) of the rectifier 101 is connected to one end of the resistor 103 and one end of the capacitor 102. The rectifier 101 is, for example, a diode. The rectifier 101 detects a peak of the current input to the rectifier 101.

The other end of the resistor 103 is connected to one end of the resistor 104, one end of the capacitor 105, and one end of the resistor 106.

The other end of the capacitor 102, the other end of the resistor 104, and the other end of the capacitor 105 are not only connected to a connection point between the input terminal of the rectifier 522 and an input terminal of the rectifier 524 of the rectifier circuit 52, but also are grounded.

The other end of the resistor 106 is connected to one end of the A/D 107 of the controller 70. Additionally, the other end of the capacitor 105 is grounded, and is connected to the other end of the A/D 107.

The capacitor 102, the capacitor 105, the resistor 103, the resistor 104, and the resistor 106 constitute a circuit that detects an average value of the current values.

Next, operation of the power supply device 1 according to the first embodiment of the present invention will be described. In FIG. 1, the power supply input terminals 11 and 12 are supplied with the DC power. The DC power supply is switch-controlled by the switching elements 21 to 24, and is supplied to the primary side coil 31 of the main transformer 30. The switching elements 21 to 24 constitute a full-bridge switching power supply circuit by which a period in which the switching elements 21 and 24 are on, and the switching elements 22 and 23 are off, and a period in which the switching elements 22 and 23 are on, and the switching element 21 and 24 are off, are switched alternately. An output of the secondary side coil 32 of the main transformer 30 is rectified by the rectifier elements 41 and 42, and thereafter is smoothed by the output choke coil 43 and the output capacitor 44, and thus is output from the power supply output terminals 17 and 18. The DC power supply from the power supply output terminals 17 and 18 is supplied to the load 19.

The output current detector 50 performs detection of a load current. When the current to the load 19 increases, the current flowing through the secondary side circuit 40 increases, and accordingly, the current in the primary side circuit 20 also increases. The current flowing through the primary side coil 31 of the main transformer 30 is detected by the current transformer 51. The output of the secondary side coil 56 of the current transformer 51 is full-wave rectified by the rectifier circuit 52, and is supplied to the current detection circuit 53.

The current detection circuit 53 performs detection of a peak by the rectifier 101 with respect to the supplied current, and a circuit constituted by the capacitor 102, the capacitor 105, the resistor 103, the resistor 104, and the resistor 106 detects a current value. The circuit constituted by the capacitor 102, the capacitor 105, the resistor 103, the resistor 104, and the resistor 106 detects an average value of the current. The controller 70 controls the drooping characteristics of the power supply device 1 in accordance with the average value of the current detected by the current detection circuit 53 and the temperature detected by the temperature detecting element 60.

Figure 3:
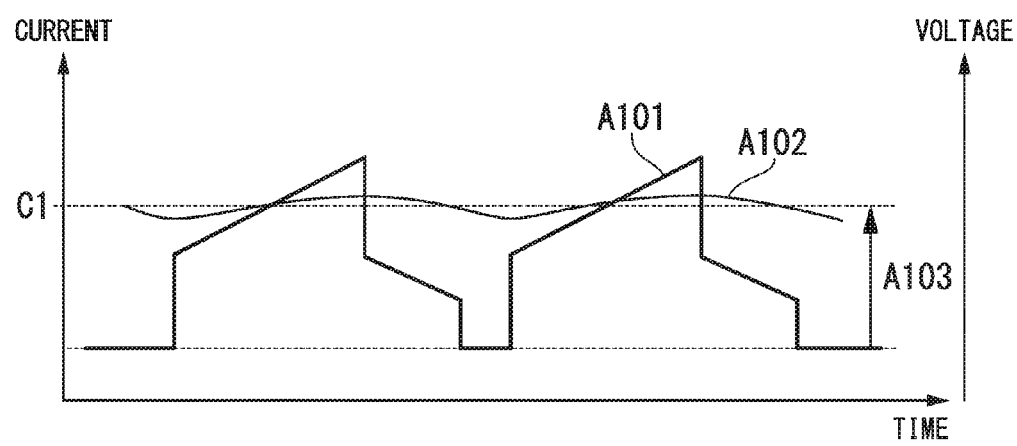
FIG. 3 is an explanatory diagram illustrating an output of the current detection circuit in the power supply device according to the first embodiment.

FIG. 3 is an explanatory diagram illustrating an output of the current detection circuit in the power supply device 1 according to the first embodiment. An output corresponding to the current flowing through the primary side coil 31 of the main transformer 30 is obtained from the secondary side coil 56 of the current transformer 51. The output of the secondary side coil 56 of the current transformer 51 is full-wave rectified by the rectifier circuit 52. In FIG. 3, a horizontal axis represents time, and a vertical axis represents the current and voltage. A waveform indicated by a reference symbol A101 represents a waveform of the output of the current transformer 51 after the full-wave rectification. An output of the rectifier circuit 52 is averaged by the current detection circuit 53, and is supplied to the A/D converter 107 in the controller 70. A waveform indicated by a reference symbol A102 represents a waveform of the output averaged by the current detection circuit 53. An arrow indicated by a reference symbol A103 represents an average value of the detected values of the load current at the A/D converter 107. Here, in FIG. 3, a line in contact with the bottom of the arrow indicated by the reference symbol A103 represents 0[A] and 0[V].

The controller 70 performs overcurrent protection control based on the current value obtained from the current detection circuit 53 of the output current detector 50. In other words, the power supply device 1 is previously set with a current that can stably supply the power, as a rated current value. The controller 70 obtains a load current value from the value detected by the current detection circuit 53 of the output current detector 50. When the load current value becomes equal to or greater than a predetermined value, the controller 70 controls the pulse widths of the switching elements 21 to 24, reduces the output voltage in accordance with the drooping characteristics, and controls the load current.

Here, in the first embodiment, in addition to the rated current value that can stably supply the power, the maximum allowable current value is set. The maximum allowable current value is a value for supplying a current equal to or larger than the rated current value, for a limited predetermined time period, within a safe range of the characteristics of the power supply device and the components thereof. For example, in a case where the load 19 is a motor or the like, a large current becomes temporarily necessary at the start-up time, compared to the stationary time. The maximum allowable current value is set as a current value at which the current can be unproblematically output within a range not exceeding the absolute maximum rating of the components, even if the temperature increases by heat or the like in such a case of the temporary supply.

Here, if one having a magnetic bias gap is used as the output choke coil 43, it is possible to enlarge the DC bias characteristics by use of the magnetic bias technique. For this reason, it is possible to enlarge the rated current of the output choke coil 43 by the magnetic bias technique, for a limited predetermined time, when performing the droop control at the maximum allowable current value.

A value of the current that can be flowed for the limited predetermined time period, as the maximum load current value, and a time period for which a load current can be flown at the maximum load current value, are obtained by, for example, actual measurements. For example, it is assumed that the rated current value is I2, and the maximum load current value is I3. The current value I2 is, for example, 150[A], and the current value I3 is, for example, 180[A]. In this case, the temperature of each component of the power supply device 1 when the load current is set to I2 is measured, thus setting the allowable temperature. Then, the measured value of the temperature of the power supply device 1 when the load current is set to I3 is compared with the allowable temperature. Then, from a range of the time period in which the measured temperature is equal to or lower than the allowable temperature when the load current is set to I3, it is possible to determine a time period in which the load current can be flown at the maximum load current value. Thus, a relationship between the maximum load current value at which the load current can be temporarily flown and its time period can be determined by measuring the temperature of each component of the power supply device 1.

Figure 4:
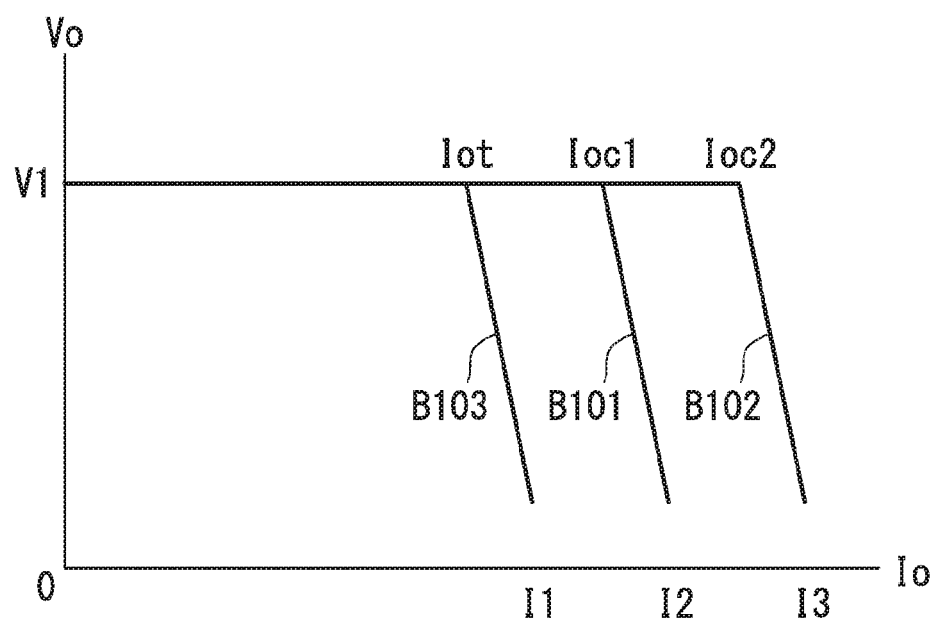
FIG. 4 is an explanatory diagram illustrating drooping characteristics of the power supply device according to the first embodiment.

FIG. 4 illustrates the drooping characteristics of the power supply device 1 according to the first embodiment of the present invention. In FIG. 4, a horizontal axis represents a load current Io, and a vertical axis represents an output voltage Vo. A characteristic indicated by a reference symbol B101 represents a drooping characteristic for performing droop control at the rated current. A characteristic indicated by a reference symbol B102 represents a drooping characteristic for performing droop control at the maximum allowable current value for the limited predetermined time. A characteristic indicated by a reference symbol B103 represents a drooping characteristic for controlling the current value at the time of heating. The memory 80 stores parameters of such drooping characteristics.

In a case where the output voltage is constant at V1 as shown in FIG. 4, as the output current increases, the heat generated by each component and functional unit of the power supply device 1 increases. In power supply devices, generally, drooping characteristics are set so that when a current equal to or larger than the current defined in the power supply devices is generated in the load, a current equal to or larger than the rated current flows, and the output voltage decreases. Thus, the output voltage is gradually lowered along with an increase in output current, thereby suppressing an increase in temperature in the power supply device, and protecting the components and functional units thereof. In the power supply device 1 of the present embodiment, even when the output current with respect to the load increases, the output current equal to or larger than the rated current is supplied to the load for the predetermined time period, while maintaining the output voltage. In this case, although the temperature of each component and functional unit of the power supply device 1 increases, in the present embodiment, the output current equal to or larger than the rated current is output while maintaining the output voltage, within a safe range of the temperature of each component and functional unit.

In the steady state, the droop control is performed by the characteristic indicated by the reference symbol B101. In other words, if it is assumed that the rated current value is Ioc1, as indicated by the reference symbol B101, in the steady state, when the detected value of the load current Io becomes the rated current value Ioc1, the output voltage Vo is droop-controlled so that the load current value Io does not exceed, for example, I2.

As described above, in the steady state, when the rated current value Ioc1 is reached, the droop control is performed by the characteristic indicated by the reference symbol B101. In contrast, in the present embodiment, if a time period for supplying the power to the load is equal to or shorter than the predetermined time period (mask period Tm), the drooping characteristic indicated by the reference symbol B101 is masked, and the drooping control is performed by the characteristic indicated by the reference symbol B102. In other words, if it is assumed that the maximum allowable current value at which the current can be supplied for the limited predetermined time is Ioc2 (Ioc2 is larger than Ioc1), as indicated by the reference symbol B102, the load current Io can be supplied up to the maximum allowable current value Ioc2 if it is within the predetermined time period. When the detected value of the load current Io reaches the maximum allowable current value Ioc2, the output voltage Vo is droop-controlled so that the detected value of the load current Io does not exceed, for example, I3.

In the power supply device 1, heat is generated in some cases depending on the surrounding environments, usage conditions, and the like. If the temperature is higher than a predetermined value, it is necessary to perform power control so that no more heat is generated. For this reason, when the temperature of the power supply device 1 becomes equal to or higher than the allowable temperature, the droop control is performed by the characteristic indicated by the reference symbol B103. In other words, if it is assumed that the allowable limit temperature is OT, and the load current that can be supplied during heating is a heating time allowable current value Iot (Iot is smaller than Ioc1), if the temperature of the power supply device 1 exceeds the allowable limit temperature OT, when the detected value of the load current Io becomes the heating time allowable current value Iot, the output voltage Vo is droop-controlled so that the load current Io does not exceed, for example, I1, as indicated by the reference symbol B103. The current value I1 is, for example, 120[A].

Here, the controller 70 obtains a load current value from the value detected by the current detection circuit 53, and determines whether or not the load current value becomes equal to or greater than the predetermined value. Then, in accordance with a result of the determination, the controller 70 changes the drooping characteristic. Further, the controller 70 controls the pulse widths of the switching elements 21 to 24, reduces the output voltage in accordance with the drooping characteristic, and controls the load current, thus performing the control of the power supply device 1.

Figure 5:
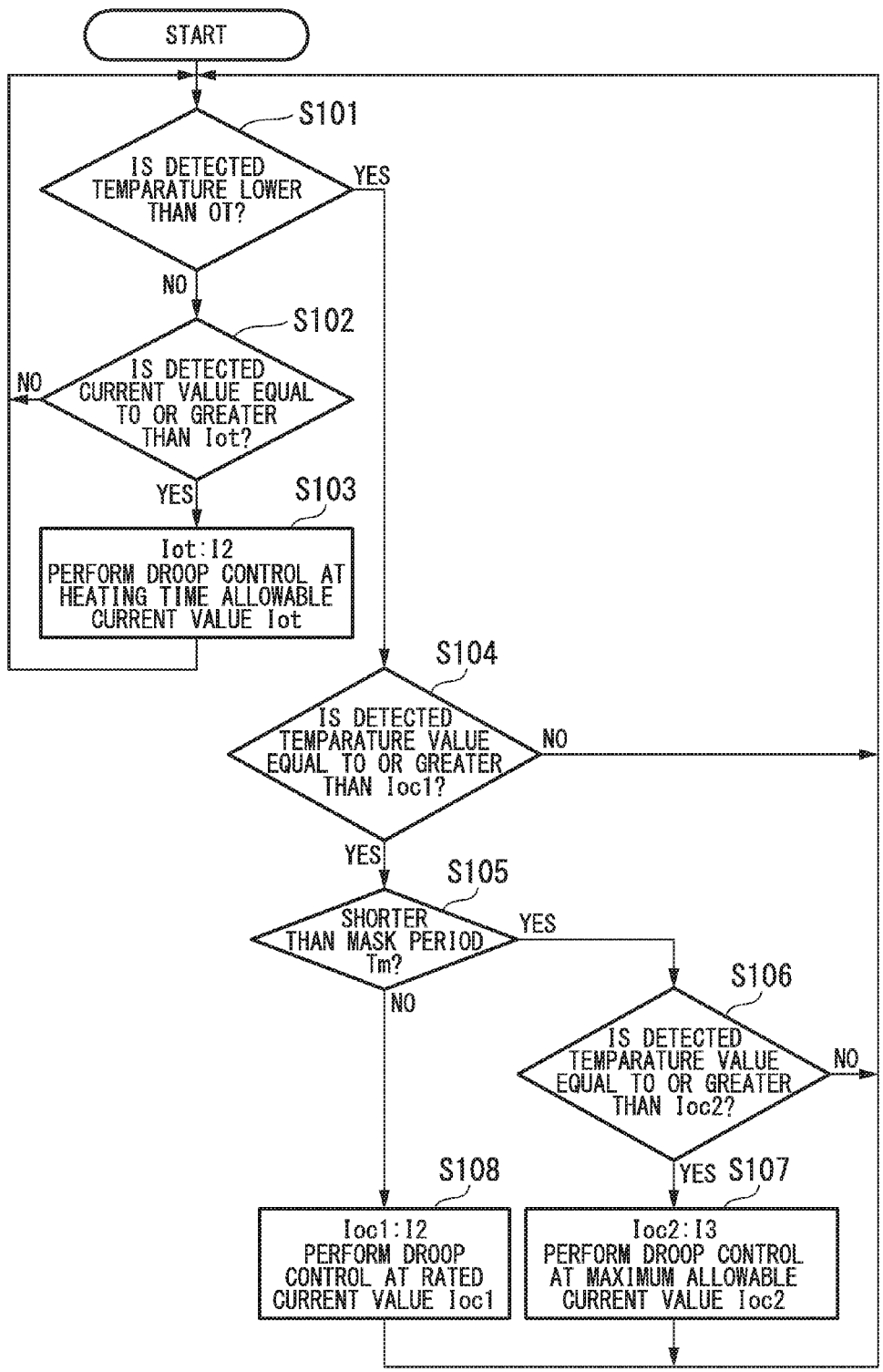
FIG. 5 is a flowchart showing power supply control by the power supply device according to the first embodiment.

FIG. 5 is a flowchart showing the power supply control by the power supply device 1 according to the first embodiment of the present invention. In FIG. 5, the controller 70 obtains a value of the temperature detected by the temperature detecting element 60, and determines whether or not the detected temperature is smaller than the allowable limit temperature OT (step S101). If the detected temperature is not smaller than the allowable limit temperature OT (step S101: NO), it is determined from the value detected by the current detection circuit 53 whether or not the detected value of the load current is equal to or greater than the heating time allowable current value Iot (step S102). If it is determined that the detected value of the load current is not equal to or greater than the heating time allowable current value Iot (step S102: NO), the controller 70 returns the processing to step S101. If the detected value of the load current is equal to or greater than the heating time allowable current value Iot (step S102: YES), the controller 70 reads from the storage 80 the drooping characteristic of the heating time allowable current value Iot, and performs the droop control so that the detected value of the load current does not exceed I1, as indicated by the reference symbol B103 shown in FIG. 4 (step S103), and returns the processing to step S101.

If it is determined in step S101 that the detected temperature is smaller than the allowable limit temperature OT (step S101: YES), the controller 70 obtains the value detected by the current detection circuit 53, and determines whether or not the detected value of the load current is equal to or greater than the rated current value Ioc1 (step S104). If the detected value of the load current is not equal to or greater than the rated current value Ioc1 (step S104: NO), the controller 70 returns the processing to step S101. If the detected value of the load current is equal to or greater than the rated current value Ioc1 (step S104: YES), the controller 70 determines from the value measured by the timer 71 whether or not the elapsed time period from the time the detected value of the load current becomes equal to or greater than the rated current value Ioc1 is shorter than the mask period Tm (step S105).

If it is determined in step S105 that the elapsed time period is shorter than the mask period Tm (step S105: YES), the controller 70 determines from the value detected by the current detection circuit 53 whether or not the detected value of the load current is equal to or greater than the maximum allowable current value Ioc2 (step S106). If the load current value is not equal to or greater than the maximum allowable current value Ioc2 (step S106: NO), the controller 70 returns the processing to step S101. If the detected value of the load current is equal to or greater than the maximum allowable current value Ioc2 (step S106: YES), the controller 70 reads from the storage 80 the drooping characteristic of the maximum allowable current value Ioc2, and performs the droop control so that the detected value of the load current does not exceed I3, as indicated by the reference symbol B102 shown in FIG. 4 (step S107), and returns the processing to step S101.

If it is determined in step S105 that the elapsed time period is not shorter than the mask period Tm (step S105: NO), the controller 70 reads from the storage 80 the drooping characteristic of the rated current value Ioc1, and performs the droop control so that the detected value of the load current does not exceed I2, as indicated by the reference symbol B101 shown in FIG. 4 (step S108), and returns the processing to step S101.

Next, a specific example of the operation in several states will be described by referring to FIG. 4 and FIG. 5 as needed.

<Description of Operation in Steady State>

First, the operation in the steady state, that is, operation when heat generated in the power supply device 1 is not large, and the detected value of the load current is equal to or less than the rated current value, is described here.

If the temperature is smaller than the allowable limit temperature OT, and the detected value of the load current does not reach the rated current value Ioc1, the loops in step S101 and step S104 shown in FIG. 5 are repeated. Thus, the overcurrent protection control is not performed, and the output voltage Vo is kept constant at, for example, V1. The voltage value V1 is, for example, 12V.

<Description of Operation when Heat Generated in Power Supply Device 1 Becomes Large>

If the heat generated in the power supply device 1 becomes large, and the temperature becomes equal to or higher than the allowable limit temperature OT, it is determined whether or not the detected value of the load current is equal to or greater than the heating time allowable current value Iot (step S102 shown FIG. 5). Then, when the detected value of the load current exceeds the heating time allowable current value Iot, the output voltage is droop-controlled so that the detected value of the load current does not exceed I1, as indicated by the reference symbol B103 shown in FIG. 4 (step S103 shown in FIG. 5). Thus, when the generated heat becomes large, the droop control is performed by the characteristic of the heating time allowable current value Iot, as indicated by the reference symbol B103. Thus, abnormal heat generation in the power supply unit 1 is prevented.

<Description of Operation when Detected Value of Load Current Exceeds Rated Current Value>

If the temperature is smaller than the allowable limit temperature OT, and the detected value of the load current becomes equal to or greater than the rated current value Ioc1, it is determined, while the elapsed time is equal to or shorter than the mask period Tm, whether or not the detected value of the load current is equal to or greater than the maximum allowable current value Ioc2 (step S106 shown in FIG. 5). Then, if the detection value of the load current is equal to or greater than the maximum allowable current value Ioc2, the output voltage is droop-controlled so that the detected value of the load current does not exceed I3, as indicated by the reference symbol B102 shown in FIG. 4 (step S107 shown in FIG. 5). If the elapsed time exceeds the mask period Tm, the output voltage is droop-controlled so that the detection value of the load current does not exceed I2 (step S108 shown in FIG. 5).

Thus, in the first embodiment of the present invention, a time period in which an allowable current value can be output is set as the mask condition. Then, if the condition that the elapsed time be shorter than the mask period Tm is satisfied, the droop control at the rated current value Ioc1 is masked, and the droop control at the maximum allowable current value Ioc2 is selected. If the elapsed time exceeds the mask period Tm, and the condition that the elapsed time be shorter than the mask period Tm becomes no longer satisfied, the processing proceeds to the droop control at the rated current value Ioc1. This makes it possible to temporarily flow to the load 19 the current equal to or greater than the rated current value.

Thus, in a first embodiment of the present invention, the output current is flown within the safe range of the temperature characteristics, with respect to the current, of the power supply device and the components thereof, so that the output current value temporarily exceeds the rated current value. This makes it possible to use the existing power supply device and components thereof, and temporarily increase the output current without increasing the size thereof. Here, with respect to the output choke coil 43, as described above, it is possible to enlarge the DC bias characteristics by the magnetic bias technique. Additionally, in the first embodiment of the present invention, the function of masking the drooping characteristic used at the time of overcurrent makes it possible to make a heat radiation design of the power supply device based on the rated current, thereby enabling a reduction in size of the power supply device.

Figure 6:
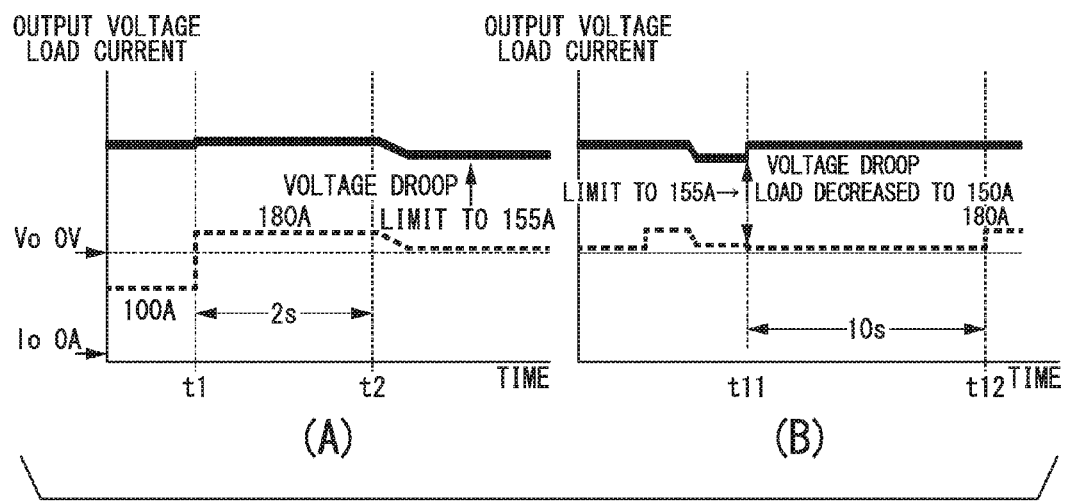
FIG. 6 it is an explanatory diagram illustrating operation at the time of overcurrent reapplication by the power supply device according to the first embodiment.

It should be noted that in a case where overcurrent is reapplied after the load current exceeding the rated current value Ioc1 is flown, in order to suppress an increase in temperature, the load current is limited so as not to exceed the rated current for a predetermined time. FIG. 6 is an explanatory diagram illustrating operation by the power supply device at the time of the overcurrent reapplication according to the first embodiment. In FIG. 6, a horizontal axis represents time, and a vertical axis represents the output voltage and load current. As shown in FIG. 6(A), it is assumed here that the load current Io is, for example, 100[A] prior to time t1. In this case, since the load current Io is equal to or smaller than the rated current value Ioc1, the overcurrent protection control is not performed, and the output voltage Vo is kept constant at, for example, V1. It is assumed here that the load current Io (e.g., 180[A]) exceeding the rated current value Ioc1 is flown from the time t1 to time t2, for example, for two seconds. At this time, the drooping control at the maximum allowable current value Ioc2 is selected if it is within the predetermined mask period Tm, thus making it possible to flow the load current, for example, I3 (e.g., 180[A]), which is equal to or greater than the rated current value Ioc1. Then, after the time t2 over the predetermined time period Tm, the load current Io is limited to 155 A. If the current I3 is flown again as the load current, in order to suppress an increase in temperature, the load current equal to or smaller than, for example, I2, is continuously flown from time t11 to time t12, for 10 seconds, as shown in FIG. 6(B).

Here, in the above example, the current flowing through the primary side coil 31 of the main transformer 30 is detected by the current transformer 51, thus obtaining the detected value of the load current. In this example, such a current exceeding, for example, 100[A], flows as the load current. For this reason, in consideration of the influence of noise and generated heat, the primary current is detected using the current transformer 51. Additionally, by detecting the primary current using the current transformer 51 and controlling the detected primary current, the protection of the switching elements 21 to 24 can also be performed. Of course, the detected value of the load current may be obtained by detecting the current flowing in the secondary side circuit 40. For example, the detected value of the load current may be obtained by providing a current detection circuit in the output power lines 15 and 16 shown in FIG. 1. Alternatively, it is possible to detect a current using a sensing resistor without using the current transformer.

Further, in the above example, the MOSFETs are used as the rectifier elements 41 and 42 to perform synchronous rectification. However, diodes may be used as the rectifier elements 41 and 42.

[Second Embodiment]

Next, a second embodiment of the present invention will be described. In the above-described first embodiment, the condition that the elapsed time period from the time the detected value of the load current becomes equal to or greater than the rated current value Ioc1 be equal to or shorter than the mask period Tm, is set as the mask condition, thus making it possible to supply the current equal to or larger than the rated current to the load only for a short time period. In contrast, in the second embodiment, a condition that the temperature be lower than a safe temperature OT2, is set as a mask condition, thus making it possible to supply the current equal to or lager than the rated current to the load only for a short time period. Here, a configuration of the power supply device is similar to that of the first embodiment shown in FIG. 1.

Figure 7:
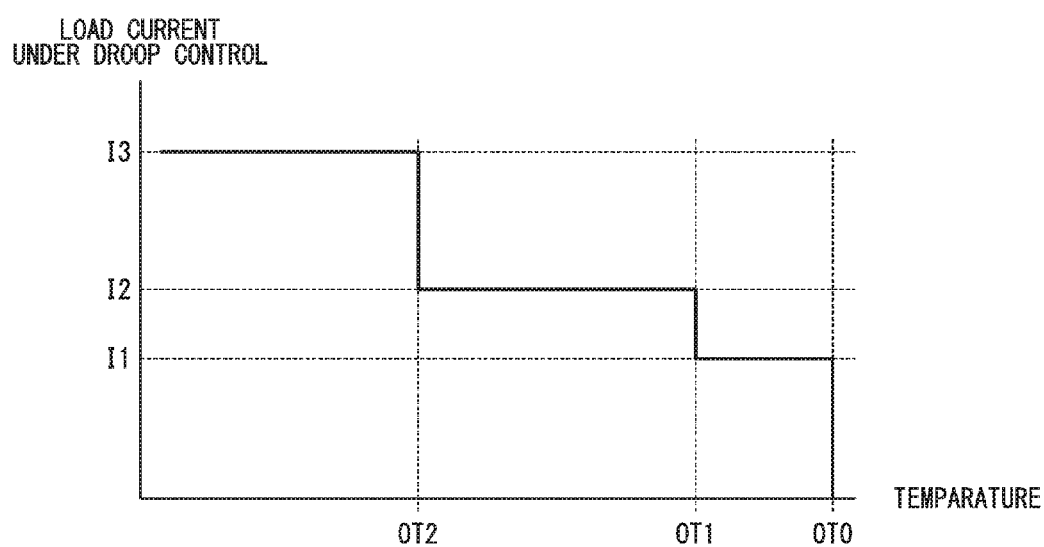
FIG. 7 is an explanatory diagram illustrating a relationship between the temperature and the drooping characteristic according to a second embodiment.

FIG. 7 is an explanatory diagram illustrating a relationship between the temperature and the drooping characteristic according to the second embodiment. In FIG. 7, a horizontal axis represents the temperature of the power supply device 1, and a vertical axis represents the load current in performing droop control. As shown in FIG. 7, if the temperature of the power supply device 1 is within a range from an allowable limit temperature OT1 (e.g., 100 degrees) to an allowable limit temperature OT0 (e.g., 120 degrees), the droop control at the heating time allowable current value Iot is performed so that the load current Io does not exceed, for example, I1, as indicated by the reference symbol B103 shown in FIG. 4. If the temperature of the power supply device 1 is within a range from the safe temperature OT2 (e.g., 90 degrees) to the allowable limit temperature OT1, the droop control at the rated current value Ioc1 is performed so that the load current Io does not exceed, for example, I2, as indicated by the reference symbol B101 shown in FIG. 4. If the temperature of the power supply device 1 is lower than the safe temperature OT2, the droop control at the maximum allowable current value Ioc2 is performed so that the load current Io does not exceed, for example, I3, as indicated by the reference symbol B102 shown in FIG. 4.

Thus, in the second embodiment, even if the detected value of the load current exceeds the rated current value Ioc1, as long as the temperature of the power supply device 1 is lower than the safe temperature OT2, the droop control at the maximum allowable current value Ioc2 is performed, as indicated by the reference symbol B102 shown in FIG. 4.

In the storage 80, the drooping characteristic of the rated current value Ioc1, the drooping characteristic of the maximum allowable current value Ioc2, and the drooping characteristic of the heating time allowable current value Iot, are stored. Additionally, values of the allowable limit temperature OT1 and the safe temperature OT2 are stored therein. Based on the detected value of the load current detected by the current detection circuit 53, and the temperature detected by the temperature detecting element 60, if the temperature is lower than the safe temperature OT2 even after the detected value of the load current exceeds the rated current value Ioc1, the controller 70 performs control so that the maximum allowable current value Ico2 can be output as the load current.

Figure 8:
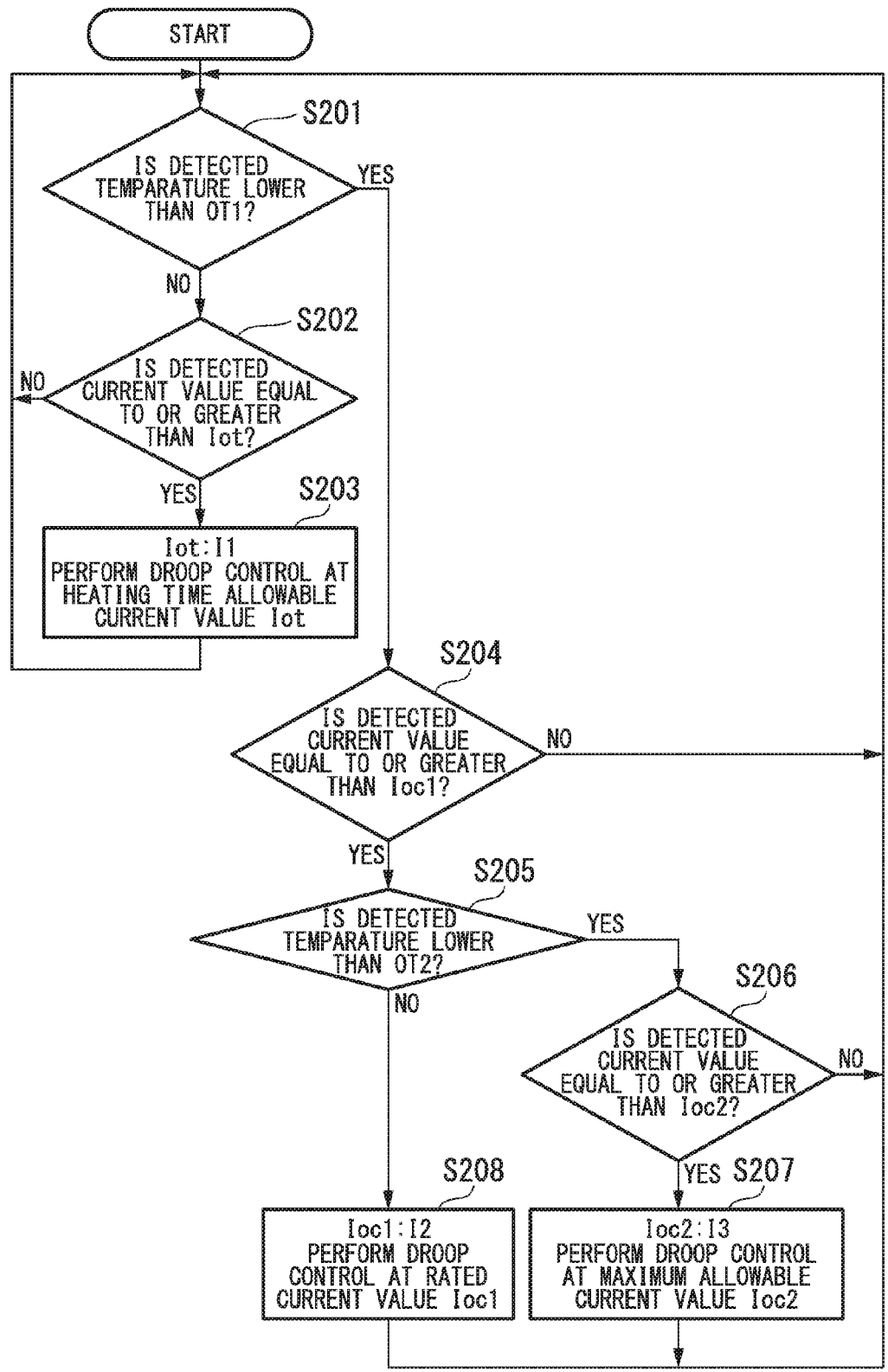
FIG. 8 is a flowchart illustrating power control by a power supply device 1 according to the second embodiment.

FIG. 8 is a flowchart showing the power control by the power supply device 1 according to the second embodiment. In FIG. 8, it is determined from the value of the temperature detected by the temperature detecting element 60 whether or not the the detected temperature is lower than the allowable limit temperature OT1 (step S201). If the detected temperature is not lower than the allowable limit temperature OT1 (step S201: NO), it is determined from the value detected by the current detection circuit 53 whether or not the detected value of the load current is equal to or greater than the heating time allowable current value Iot (step S202). If it is determined that the detected value of the load current is not equal to or greater than the heating time allowable current value Iot (step S202: NO), the controller 70 returns the processing to step S201. If the detection value of the load current is equal to or greater than the heating time allowable current value Iot (step S202: YES), the controller 70 performs the droop control so that the detected value of the load current does not exceed I1, as indicated by the reference symbol B103 shown in FIG. 4 (step S203), and returns the processing to the step S201.

If it is determined in step S201 that the detected temperature is lower than the allowable limit temperature OT1 (step S201: YES), the controller 70 determines from the value detected by the current detection circuit 53 whether or not the detected value of the load current is equal to or greater than the rated current value Ioc1 (step S204). If the detected value of the load current is not equal to or greater than the rated current value Ioc1 (step S204: NO), the controller 70 returns the processing to step S201. If the detected value of the load current is equal to or greater than the rated current value Ioc1 (step S204: YES), the controller 70 determines whether or not the detected temperature is lower than the safe temperature OT2 (step S205).

If it is determined in step S205 that the detected temperature is lower than the safe temperature OT2 (step S205: YES), the controller 70 determines from the value detected by the current detection circuit 53 whether or not the detected value of the load current is equal to or greater than the maximum allowable current value Ioc2 (step S206). If the load current value is not equal to or greater than the maximum allowable current value Ioc2 (step S206: NO), the controller 70 returns the processing to step S201. If the detected value of the load current is equal to or greater than the maximum allowable current value Ioc2 (step S206: YES), the controller 70 performs the droop control so that the detected value of the load current does not exceed I3, as indicated by the reference symbol B102 shown in FIG. 4 (step S207), and returns the processing to step S201.

In step S205, if the detected temperature is not lower than the safe temperature OT2 (step S205: NO), the controller 70 performs the droop control so that the detected value of the load current does not exceed I2, as indicated by the reference symbol B101 shown in FIG. 4 (step S208), and returns the processing to step S201.

Next, a specific example of the operation in each state will be described by referring to FIGS. 4, 7, and 8, as needed.

<Description of Operation in Steady State>

Operation in the steady state and operation when the heat generated in the power supply device 1 becomes large are similar to those in the above-described first embodiment. In other words, if the temperature is lower than the allowable limit temperature OT1 (FIG. 7), and the detected value of the load current has not yet reached the rated current value Ioc1, the loops in step S201 and step S204 shown in FIG. 8 are repeated, so that the overcurrent protection control is not performed, and the output voltage Vo is kept constant at, for example, V1. Additionally, if the heat generated in the power device 1 is large, and the temperature becomes no longer lower than the allowable limit temperature OT1 (FIG. 7), the output voltage is droop-controlled so that the detected value of the load current does not exceed I1, as indicated by the reference symbol B103 shown in FIG. 4 (step S203 shown in FIG. 8).

<Description of Operation when Detected Value of Load Current Exceeds Rated Current Value>

If the temperature is lower than the allowable limit temperature OT1, and the detected value of the load current becomes greater than the rated current value Ioc1, as long as the temperature is lower than the safe temperature OT2 (FIG. 7), it is determined whether or not the detected value of the load current is equal to or greater than the maximum allowable current value Ioc2 (step S206 shown in FIG. 8). Then, if the detected value of the load current is equal to or greater than the maximum allowable current value Ioc2, the output voltage is droop-controlled so that the detected value of the load current does not exceed I3, as indicated by the reference symbol B102 shown in FIG. 4 (step S207 shown in FIG. 8). Then, if the operation is continued while the load current is increased up to the maximum allowable current value Ioc2, the temperature increases. When the temperature exceeds the safe temperature OT2 (FIG. 7), the output voltage is droop-controlled so that the detected value of the load current does not exceed I2, as indicated by the reference symbol B101 shown in FIG. 4 (step S208 shown in FIG. 8).

Thus, in the second embodiment, the temperature at which the allowable current value can be output is set as the mask condition. Then, if the temperature satisfies the mask condition that the temperature be lower than the safe temperature OT2, the droop control at the rated current value Ioc1 is masked, and the droop control at the maximum allowable current value Ioc2 is selected. If the operation is continued while the load current is kept at the maximum allowable current value Ioc2, the temperature increases, and the mask condition that the temperature be lower than the safe temperature OT2 becomes no longer satisfied, the processing proceeds to the droop control at the rated current value Ioc1. This makes it possible to temporarily flow to the load 19 the current equal to or larger than the rated current value.

Here, in the second embodiment of the present invention, the temperature detecting element 60 that detects the temperature of the power supply device 1 is preferably provided in the vicinity of an element susceptible to the effect of overcurrent. In other words, the temperature detecting element 60 is provided in the vicinity of at least any one of the switching elements 21 to 24, the main transformer 30, the rectifier elements 41 and 42, and the output choke coil 43. Additionally, the temperature detecting element 60 may be provided in the vicinity of a plurality of elements susceptible to the effect of overcurrent, so that the temperature of the power supply device 1 is determined from results of detection by the plurality of temperature detecting elements.

The description has been given in the above-described first and second embodiments with respect to the case where the circuit of the primary side circuit 20 is constituted by the full bridge circuit. In the power supply device 1 of the present invention, however, the circuit configuration of the primary circuit 20 is not limited to a specific configuration. For example, the circuit of the primary side circuit 20 may be of non-resonance PWM control type, or a switching power supply device including a phase-shift switching circuit.

The description has been given in the above-described first and second embodiments with respect to the example where the three drooping characteristics are stored in the storage 80, and the controller 70 selects a drooping characteristic stored in the storage 80 in accordance with the load current value and the mask condition. However, the present embodiments are not limited thereto. The drooping characteristics stored in the storage 80 may be the first drooping characteristic based on the rated output current, and the second drooping characteristic according to a current value greater than the rated output current value. Additionally, the controller 70 may select one from the two drooping characteristics. Further, the description has been given in the above present embodiment with respect to the example where there are one first drooping characteristic and two second drooping characteristics. However, a configuration may be such that two or more second drooping characteristics are used so that one drooping characteristic is selected therefrom.

Here, a program for implementing the functions of the controller 70 of the present invention may be recorded on a computer-readable recording medium, so that a computer system can read and execute the program recorded on the recording medium to implement the operation and control of the controller 70. Here, the "computer system" includes an OS and hardware such as peripheral devices. Additionally, the "computer system" includes a WWW system with a website providing platform (or display platform). Further, the "computer-readable recording medium" means a storage device, such as: a portable medium, for example, a flexible disk, a magneto optical disk, a ROM, or a CD-ROM; or a hard disk built in a computer system. Moreover, the "computer-readable recording medium" may also include a medium that temporarily stores a program, such as a volatile memory (RAM) included in a computer system which serves as a server or client in a case where the program is transmitted via a network such as the Internet, or a communication line such as a telephone line.

Additionally, the above program may be transmitted from a computer system storing that program in a storage device or the like to another computer system via a transmission medium or a transmitted wave in the transmission medium. Here, the "transmission medium" that transmits a program means a medium having the function of transmitting information, such as a network (communication network) like the Internet, or a communication line (communication line) like a telephone line. Further, the above program may be a program for implementing part of the above-described functions. Moreover, the above program may be a program that can implement the above-described functions in combination with the program already stored in the computer system, that is, a differential file (differential program).

DESCRIPTION OF REFERENCE SYMBOLS

20 . . . primary side circuit, 21 to 24 . . . the switching element, 25 . . . input capacitor, 30 . . . main transformer, 40 . . . secondary side circuit, 41, 42 . . . rectifier element, 43 . . . output choke coil, 44 . . . output capacitor, 50 . . . output current detector, 51 . . . the current transformer, 52 . . . rectifier circuit, 53 . . . current detection circuit, 60 . . . temperature detecting element, 70 . . . controller, 80 . . . storage

The invention claimed is:

1. A power supply device comprising:
a storage storing a first drooping characteristic of a rated output current value, and a second drooping characteristic of an allowable current value that is greater than the rated output current value;
an output current detector configured to detect a load current value;
a controller configured to select a drooping characteristic stored in the storage in accordance with the load current value detected by the output current detector and a mask condition; and
a transformer including a first coil and a second coil and configured to perform conversion of a voltage,
wherein the first coil is connected to a switching element,
the second coil is connected to a rectifier element and an output choke coil,
the output choke coil has a magnetic bias gap,
the rated output current value is a rated output current value of the output choke coil, and
the allowable current value is a current value enlarged from the rated output current value by the magnetic bias gap.

2. The power supply device according to claim 1, wherein the mask condition is at least any one of a time period in which the allowable current value is outputtable, and a range of temperature in which the allowable current value is outputtable.

3. The power supply device according to claim 1, further comprising:
a temperature detecting element configured to detect a temperature;
wherein the temperature detecting element is provided in vicinity of at least any one of the rectifier element, the output choke coil, and the switching element, and
the controller is configured to select any one of the drooping characteristics stored in the storage, based on the temperature detected by the temperature detecting element.

4. A method of controlling a power supply device comprising a transformer including a first coil connected to a switching element and a second coil connected to a rectifier element and an output choke coil, the method comprising:
previously storing a first drooping characteristic of a rated output current value, and a second drooping characteristic of an allowable current value that is greater than the rated output current value; and
selecting a drooping characteristic stored in the storage in accordance with the load current value detected by the output current detector and a mask condition, and performing droop control,
wherein an output choke coil having a magnetic bias gap is used as the output choke coil,
a rated output current value of the output choke coil is set as the rated output current value, and
a current value enlarged from the rated output current value by the magnetic bias gap is set as the allowable current value.

* * * * *